March 15, 1938.          R. C. MUZZO          2,111,052
                          TABLE SURFACER
                Filed April 9, 1936      3 Sheets—Sheet 1
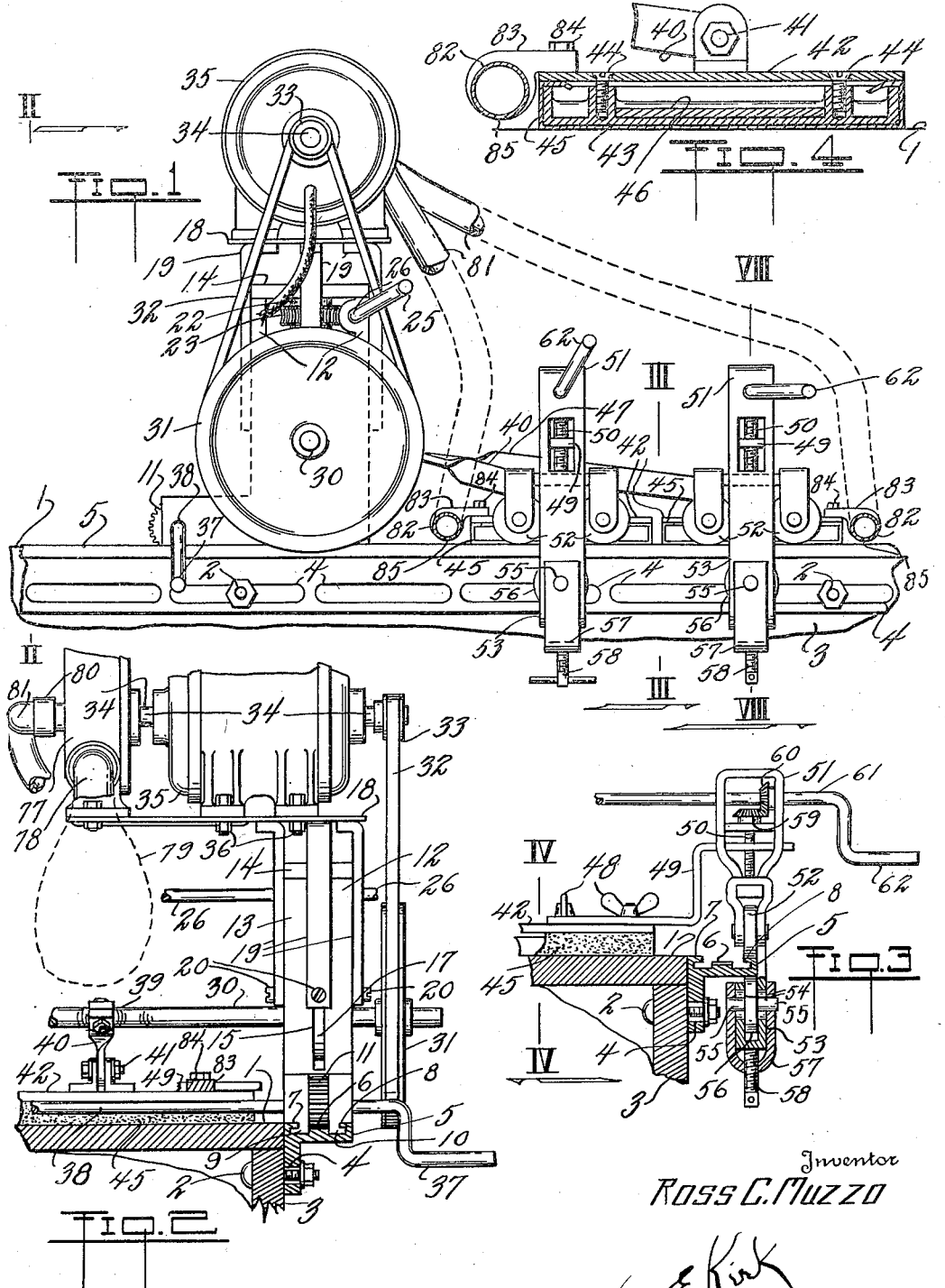
Inventor
Ross C. Muzzo
By
Geo E Kirk
Attorney

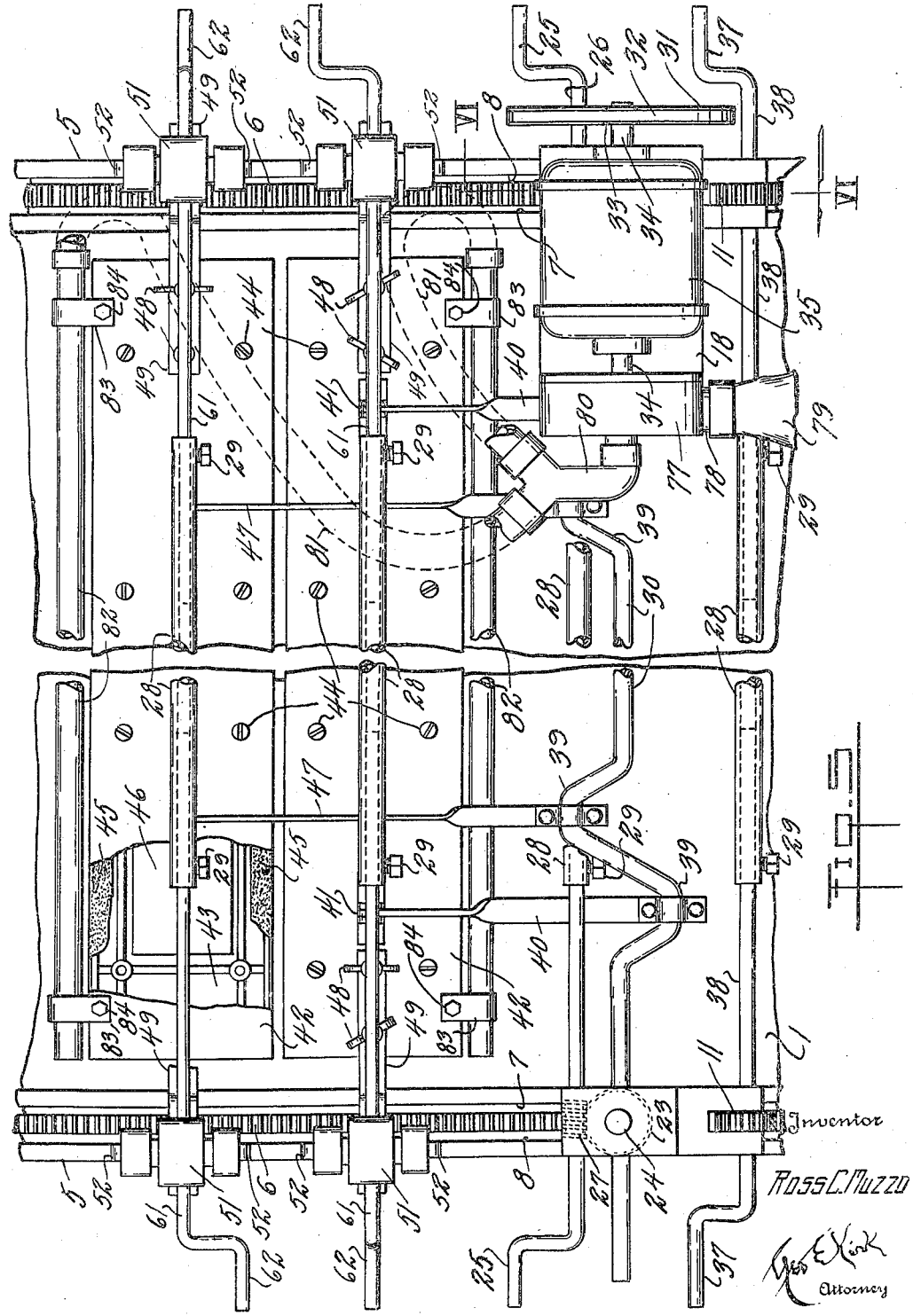

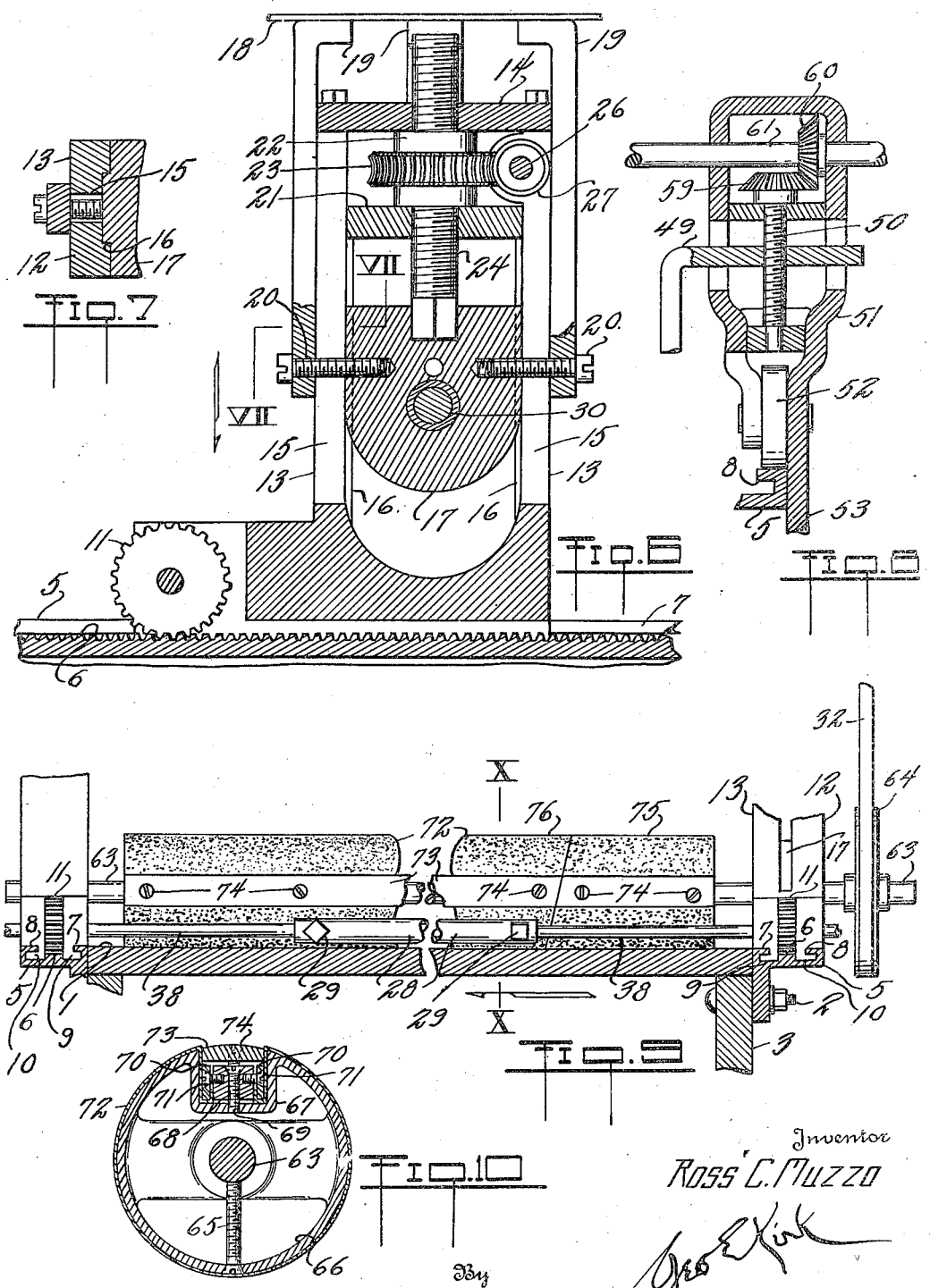

Patented Mar. 15, 1938

2,111,052

UNITED STATES PATENT OFFICE 2,111,052

TABLE SURFACER

Ross C. Muzzo, Toledo, Ohio

Application April 9, 1936, Serial No. 73,439

5 Claims. (Cl. 51—241)

This invention relates to producing and redressing surfaces, especially level or plane surfaces.

This invention has utility when adapted to furniture tops, and more particularly gaming tables as for pool and billiards.

Referring to the drawings:

Fig. 1 is a side elevation, with parts broken away, of an embodiment of the invention in working position as upon a pool table;

Fig. 2 is a fragmentary view upon the line II—II, Fig. 1, looking in the direction of the arrow;

Fig. 3 is a section on the line III—III, Fig. 1;

Fig. 4 is a section on the line IV—IV, Fig 3;

Fig. 5 is a fragmentary plan view of the invention as shown in Fig. 1;

Fig. 6 is a section on the line VI—VI, Fig. 5;

Fig. 7 is a section on the line VII—VII, Fig 6;

Fig. 8 is a section on the line VIII—VIII, Fig. 1;

Fig. 9 is a transverse section approximately that of Fig. 2, having a rotary surfacer adapted thereto in lieu of the flat surfacer of Fig. 4; and Fig. 10 is a section on the line X—X, Fig. 9.

Gaming table top 1 is shown with its side rails removed and side rail mounting bolts 2 in position. These mounting bolts 2, herein protrude from table side 3, extend through slots 4 in rails 5 providing rack 6 and lateral overhangs 7, 8, thereby forming an effective holding track. Under each of these overhangs 7, 8, is a guide shoe 9, 10, spaced by pinion 11 cooperating with the rack 6. Uprights 12, 13, rising from the guide shoes 9, 10, extend to plate 14 and have therebetween a slot 15. Between the pairs of these risers 12, 13, is guide-way 16 for bearing block 17 (Fig. 6). Spanning this plate 14 is plate 18 having arms 19 therebelow to screws 20 engaging the bearing block 17. Between this bearing block 17 and the plate 14 is plate 21 fixed as to the plate 14. Between these plates 14 and 21 is nut 22 having worm wheel 23 thereon. This nut 22 engages screw 24 fixed with the bearing 17 and freely slidable relatively to the plates 14, 21.

Handle 25 on shaft 26 extends through uprights 12, 13 and there carries worm 27. This shaft 26 extends transversely of the table top 1 and there enters pipe section 28, with which it may be held by set screw 29. This pipe section 28 is an adjustable spacer between the rails 5 upon the opposite sides of the table top 1, and accordingly is adapted to take care of different width table tops. Rotation of this crank 25 operating the worm 27 acts upon the worm wheel 23 at the nut 22, and accordingly progresses such nut as to screw 24, thereby feeding the bearing 17 toward or from the track. This bearing 17 carries shaft 30. Mounted on this shaft 30 is grooved pulley 31 (Figs. 1, 2), from which extends V-belt 32 to groove pulley 33 on shaft 34 of motor 35 mounted on the plate or deck 18 by bolts 36 (Fig. 2). This shaft 30 is a substitutive shaft not only as to transverse dimension of the table or work but as to the configuration of such shaft.

In the operation of this generally applicable surfacing equipment, there is range for reciprocating type of surface device as well as the cylindrical type or rotary. In connection with the adaptation of this device for finishing table tops, this primary mounting of the actuating source may be progressed along the table and accurately located against any skew relationship by rotating crank 37 on shaft 38 carrying pinions 11 to mesh with each rack 6. As in the instance of the shaft 26 there may be telescopic spacer pipe 28 with set screw 29 to engage the shaft 38 for the desired transverse spacing section adjustment between the tracks. It is thus seen that by rotating the crank 37 there may be located the working tools as desired on the table and such may be progressed during the working operations.

In the event of rubber or reciprocating type of surfacer, shaft 30 may be provided with cranks 39 (Fig. 5) having connecting rods 40 therefrom with pivotal connection 41 to plates 42 (Fig. 4). These plates 42 are shown carrying faces or shoes 43 connected thereto by screws 44 and thereby clamping surfacing sheet 45. Loading 46 may be in the shoe 43. This surfacing sheet 45 may be adopted according to the conditions of surfacing sought. For rough grinding it may be a coarse emery or sand paper. For smooth grinding it may be a very fine sand, felt, and there may be a polishing material as rouge instead of a coarse abrasive. In fact, with these connections, wherein in addition to the connecting rods 40 there are longer connecting rods 47 to hold a pair of these plates 42 in adjacent relation, there may be oppositely actuated and one character of dressing fineness as to one rubber or polishing surface, and a different degree of fineness adopted for the other.

These rubbers may to some extent be positioned by the weight thereof of the loading 46. In order to avoid hammering or uneven action even though reciprocated at high speed, these plates 42 may have their position retained relatively to the table top or surface 1. To this end wing screws 48 (Fig. 3) may mount bracket 49 (Figs. 3, 8) having thread connection with screw 50 rotatable in housing 51. This housing 51 mounts rollers 52 to ride on the upper side of the rail track 5, say adjacent the overhang 8, as thus providing anti-friction support. This housing 51 has arm 53 extending past the rollers 52 and there providing slots 54 for trunnions 55 of roller 56 upon the under side of track 5 adjacent overhang 8 and opposing the rollers 52. This roller 56 has the trunnions 55 in U-shaped member 57 carrying adjusting screw 58 rotatably fixed with and swiveled in the portion of the arm 53 below the roller 56, thereby providing an adjustable positioning means for bringing the roller 56 into opposed clamping position as to the roller 52 in taking up play of such rollers as to the track 5. This provides an effective anti-friction mounting for the housing 51 and a definite positioning of the surfacing means or rubber 42.

The bracket 49, however, is adjustable as to the surface 1 relatively to the fixed position of the anti-friction bracket 51. To this end, the screw 50 is provided with pinion 59 in mesh with beveled pinion 60 on shaft 61 terminating in end crank 62. This shaft 61 has in its extent over the work surface 1 sectional portion or pipe 28 with which it is anchored by set screw 29 and thereby providing compensation for the width dimension of the work 1. Rotation of the crank 62 is thus effective to raise or lower surfacing means and thereby adjust its definite relation as to the surface 1 being acted upon. It is thus possible to increase or decrease the working pressure on the work 1 to meet the desired operating conditions.

This speed of reciprocation of the reciprocating surfacing means 42 may be determined by the size of the groove pulley 31 as to the diameter of the groove pulley 33. Further range of working effectiveness hereunder is practical in substituting for the shaft 30 shaft 63 with grooved pulley 64 actuable from the V-belt 32. This shaft 63 may have anchored thereon by set screw 65 working cylinder 66 having recessed side 67 in which may be inserted block 68 fixed by set screw 69. This block 68 has side faces 70 adjustable by screws 71 into holding relation for facing sheet 72 as an abrasive or polishing surface for the cylinder 66. As so positioned, this abrasive or polishing material in the range as used on the surfacing blocks 43 or in contra-distinction therefrom may be a primary finishing or a final finishing operation or be a factor in the speed of work conducted. In addition to this block 68, there may be a closure plug 73 assembled by screws 74 with the block 68.

In compensating for the different transverse dimensions or width of the work surface 1 between the rails, there is not only the telescopic assembly means due to the pipes 28 and the set screws 29 but adjustment may be made for the desirable transverse working effectiveness of the roller or cylinder 66 by having such divide into sections 75, 76. Analogous selection may be made in determining the transverse dimension to total in the blocks 43 and plates 42.

Supplementally hereunder, provision may be taken adjacent the surface 1 acted upon against creating undesirable atmospheric conditions as by dust rising therefrom. To this end, the motor 35 may have its shaft 34 extend to carry suction pump or fan 77 (Fig. 2) with spill or discharge therefrom at fitting 78 into dust collector bag 79.

Intake fitting 80 has ducts 81 therefrom into proximity of the surface 1, whether acted upon by the cylinder covering sheet 72 or by the reciprocating surfacing means having the surface sheets 45. These ducts 81, accordingly, may extend to cross tubes 82 mounted by brackets 83 and anchored by bolts 84. These cross ducts 82 are provided with intake ports 85 to the end that suction created by the fan 77 may gather loose particles as dust, whether from the abrasive or the surface being acted upon, and bring such into the collector or bag 79.

What is claimed and it is desired to secure by Letters Patent is:

1. A table surfacer for a flat top rectangular table embodying a pair of tracks, bracket means for mounting the tracks with the table top sides adjacent the plane of and just below the table top, said tracks lying in a plane parallel to and below the table top, a bridge spanning over the table top and sustained on said tracks, and abrading means for the table top operatively connected to said bridge and adjustably located at the table top and operable in proximity to the plane of said tracks, thereby determining the plane of work operation at the region of the track support, there being span-adjusting means for bridge width to conform to the spaced position for the tracks as determined by the table top.

2. Surface dressing equipment comprising a pair of tracks mountable in anchored relation with an article of work rising therebetween, said tracks being parallel with each other upon opposite sides of the work and adjustable toward and from each other to fit the work, a bridge having a span extending transversely over the work and adjustable to coact with and shiftable along the tracks, surface-engaging flat face means depending from the bridge to the plane of the work and extending toward the tracks, and a control carried by said bridge for actuating the surface-engaging means on the surface of the work in parallel rubbing action relatively to the tracks, thereby determining the plane of working operation in the region of the tracks as the support.

3. Surface dressing equipment comprising a pair of tracks mountable in anchored relation to be supported by and with an article of work rising therebetween, said tracks being parallel with each other upon opposite sides of the work, an adjustable width span bridge extending transversely over the work and shiftable along the tracks, surface-engaging means disposed between and approximately into the plane of the tracks to act upon the work, and a control carried by said bridge for actuating the surface-engaging means on the surface relatively to the tracks, thereby determining a plane of working operation in the region of the tracks as the support.

4. Surface dressing equipment comprising a pair of tracks mountable in anchored relation with an article of work rising therebetween, said tracks being mountable in parallel with each other into adjusted position upon opposite sides of the work, a bridge having a span extending transversely over the work and adjustable to coact with and shiftable along the tracks, surface-engaging means disposed between the tracks to act upon the work, said means being stabilized by locating the work adjacent the plane of the tracks and there determining a plane for work operation at the region of support by the tracks, a drive on the bridge for actuating the means relatively to the work, and adjusting means for the tracks for positioning the surface-engaging means relatively to the work, said tracks being below the bridge, the engaging means, and the drive, and said adjusting means being below the tracks.

5. Surface dressing equipment comprising a pair of tracks mountable in anchored relation with an article of work rising therebetween, said tracks being parallel with each other upon opposite sides of the work, a bridge extending transversely over the work and shiftable along the tracks, surface-engaging means disposed between and approximately into the plane of the tracks and moving relatively to the bridge to act upon the work for removing particles therefrom, gathering and conducting means for the removed particles movable relatively to and sustained with the bridge by the tracks clear of the work and including a fan, and a common drive for the surface-engaging means and fan, said surface-engaging means thereby being operable in a plane for action upon the work at the region of support by the tracks.

ROSS C. MUZZO.